Figure 9:
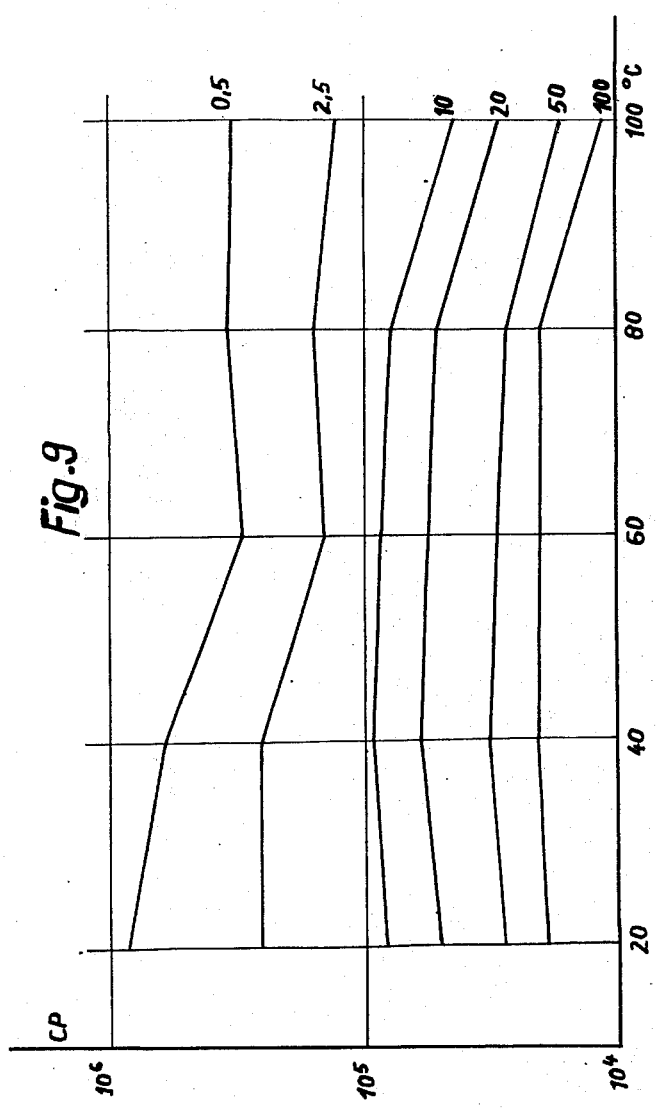

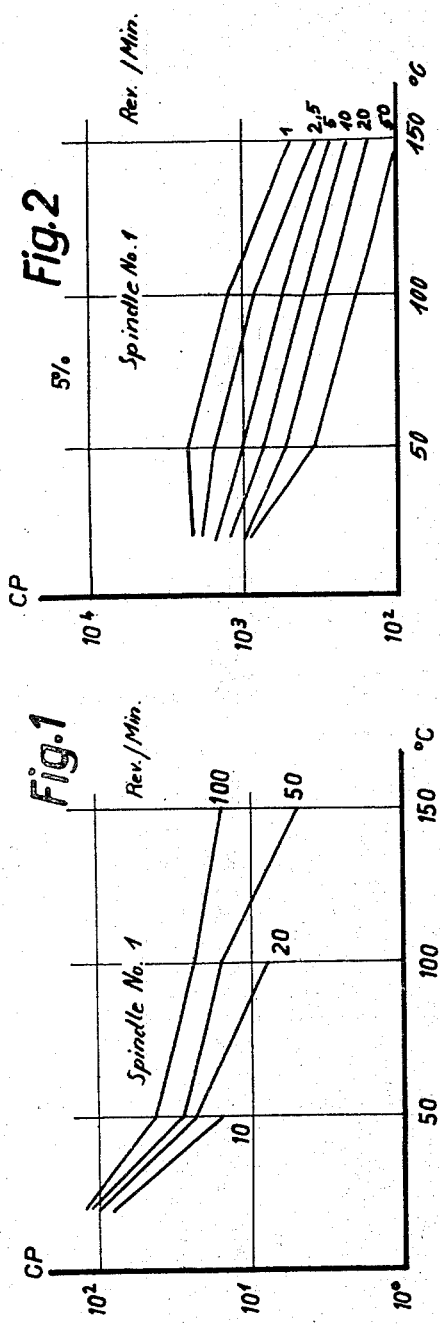
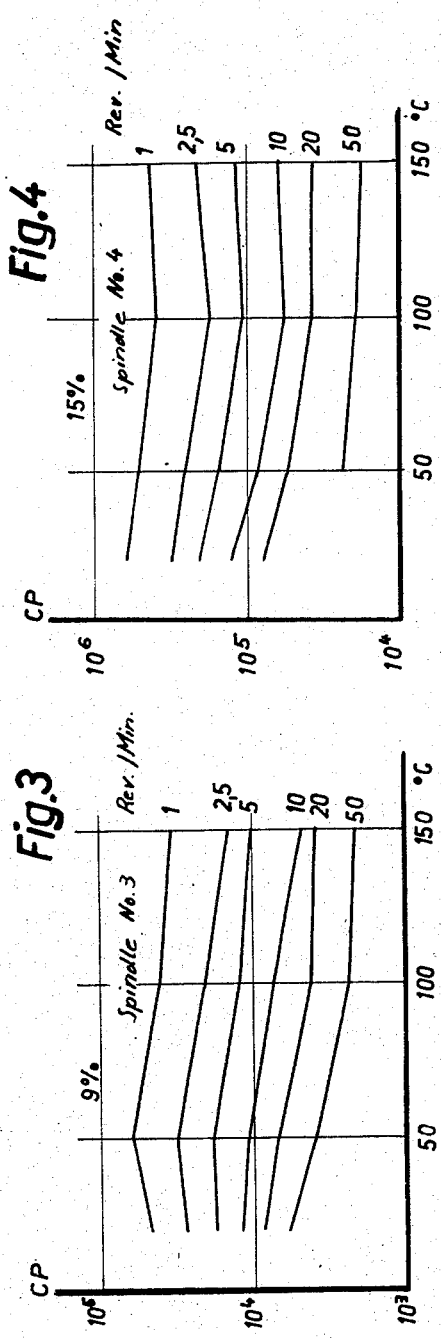

May 17, 1966     H. SCHREIBER     3,251,772
LUBRICATING COMPOSITION CONTAINING CROSS-LINKED POLYMER
Filed Jan. 30, 1962     3 Sheets-Sheet 2
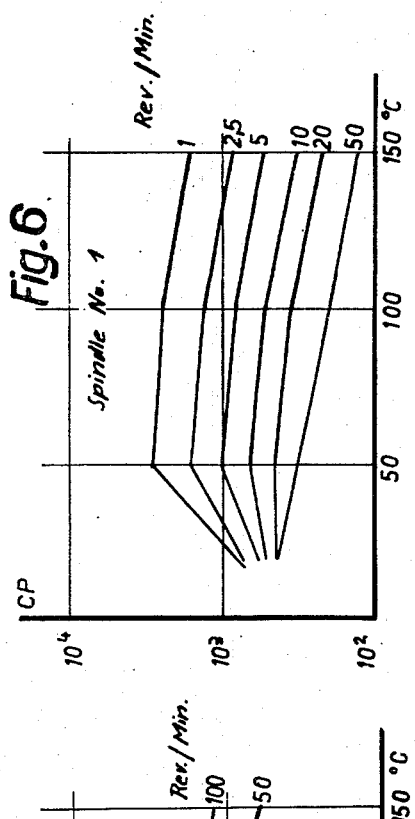
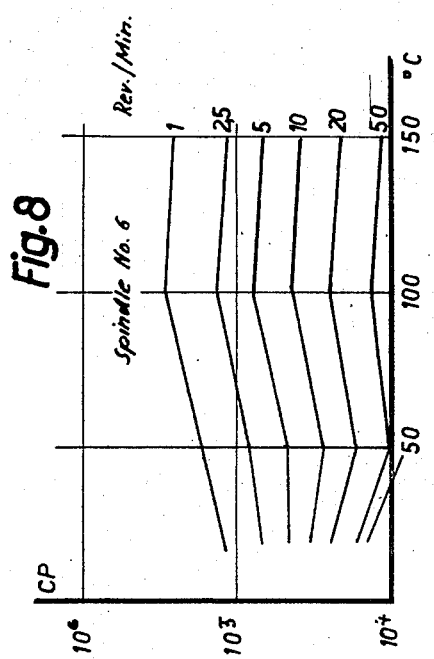
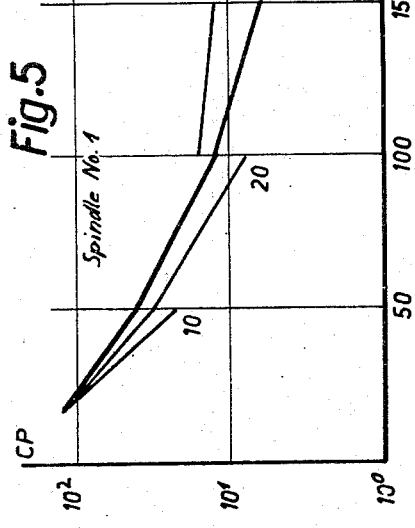
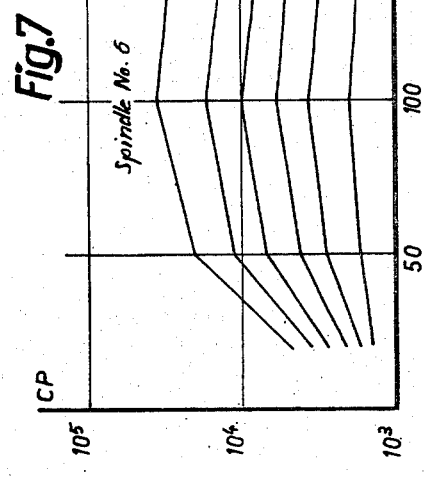

United States Patent Office 3,251,772
Patented May 17, 1966

3,251,772
LUBRICATING COMPOSITION CONTAINING CROSS-LINKED POLYMER
Herbert Schreiber, Zurich, Switzerland, assignor to Kaspar Winkler & Co., Inhaber Dr. Schenker-Winkler, Zurich, Switzerland
Filed Jan. 30, 1962, Ser. No. 169,765
2 Claims. (Cl. 252—49.6)

The present invention relates to lubricating compositions hydraulic oils and lubricant greases having improved viscosity-temperature characteristics.

Oils and fats generally employed as lubricants, hydraulic oils and lubricant greases, exhibit the disadvantage of decreasing viscosities at increasing temperatures. However, viscostatic properties, i.e., especially reduced dependency of viscosity with respect to changes in temperature for these materials are of major importance.

Heretofore attempts have been made to improve viscostatic properties, e.g., by addition of oil-soluble linear macromolecular compounds to appropriate base fluids. Though such compositions become less fluid with increasing temperatures than the base oil or base liquid alone, their decrease in viscosity due to increasing temperature is still significant and in many aspects detrimental.

It is an object of the present invention to provide lubricants, hydraulic oils and lubricant greases, the viscosities of which are practically independent of temperature over wide temperature ranges. Accordingly, the disadvantageous effects of increasing temperature on viscosity are overcome by the present invention. Further, according to the present invention the viscosity-temperature curve may not only be flattened but also inverted. Besides temporary viscosity loss under shear and, at higher dosages, the appearance of a flow limit may be produced. That means that the viscosity decreases with increasing shear stress and flowing of the composition begins only at a determined value.

According to the present invention, the disadvantages of the prior art are overcome by compositions comprising a non-volatile base fluid and discrete particles of a macromolecular substance which due to slight cross-linking is not soluble but swells tridimensionally in said base fluid. The present invention makes use of the swelling properties of such macromolecular substances which without cross-linkage would be soluble in oleaginous fluids, but due to said cross-linking are only swelling.

The slightly cross-linked macromolecular substances which are utilized in the compositions of the present invention may be prepared by conventional methods such as polymerization, polycondensation, polyaddition or by conversion of products derived from natural sources. Synthetically prepared macromolecular substances are preferred, since their preparation may be controlled with a view to the intended use; besides, the substances so prepared are of uniform size and shape. Slight cross-linking of any desired degree may be achieved by addition of polyfunctional reagents to the reaction mixture or by subsequent reaction of linear polymers with polyfunctional agents. The degree of cross-linking can be controlled by the amount of polyfunctional agent used during the preparation of the macromolecular substances. The maximum degree of swelling is a function of the degree of cross-linking of the macromolecular substance in that with increasing cross-linkage the maximum degree of swelling decreases. The maximum degree of swelling at room temperature should be at least about 1. The maximum degree of swelling generally is defined by the amount of swelling agent (in parts by weight) which is absorbed by one part by weight of the dry macromolecular substance at a given temperature. It may be determined as follows: A defined amount of the macromolecular substance is swollen in an excess of fluid until equilibrium is established whereafter excessive swelling agent is removed. Then the increase in weight of the swollen substance is determined. However, the optimum concentrations may also be derived from the curve which is obtained by drawing the viscosity against concentration, both on a logarithmical scale, which curve is S-shaped. The optimum concentration is to be taken from the abcissa at that point where the curve after positive curvature in its first part shows the maximum negative curvature.

Preferably the slightly cross-linked macromolecular substances are prepared by polymerization or copolymerization of olefinically unsaturated compounds in the presence of cross-linking agents. Suitably olefinically unsaturated compounds are, e.g., olefins such as ethylene, propylene butene, butadiene, isoprene; styrene, alkylstyrenes, vinyltoluene; vinyl esters, vinyl ethers; esters of unsaturated carboxylic acids such as acrylic acid, methacrylic acid, crotonic acid, fumaric acid and maleic acid.

Appropriate cross-linking agents are compounds containing at least two polymerizable double bonds, e.g., divinylbenzene, derivatives of acrylic acid or methacrylic acid and polyvalent alcohols, polyamines, unsaturated alcohols and amines such as, e.g., glycol dimethacrylate, allyl methacrylate, β-allyloxy-ethylacrylate, methylene, bisacrylamide, β-vinyloxy-ethylacrylate; anhydrides of unsaturated carboxylic acids and salts of carboxylic acids and polyvalent metals; polymers containing olefinically unsaturated groups, e.g., the polymers and copolymers of butadiene or isoprene containing high amounts of vinyl groups, unsaturated polyesters such as, e.g., those derived from glycol and maleic acid, or polymers derived from allylacrylate, vinylacrylate, β-vinyloxy-ethyl-acrylate or methacrylate, by anionic or cationic polymerisation. In performing the polymerization under conditions yielding a high degree of conversion even monomeric conjugated diolefins, e.g., butadiene and isoprene, may act as cross-linking agents. Further, by use of polyfunctional or unsaturated initiators, by appropriate chemical treatment or by radiation with actinic light the desired slight cross-linking may be obtained. Apart from the desired degree of cross-linking the polymers should exhibit a marked resistance to aging.

The fine particles used in the present compositions may be prepared by any suitable method. In case of products prepared by bulk polymerization a milling operation may be carried out. Coarse macromolecular materials may be disintegrated in the dry state or after swelling, e.g., in a colloid mill. In a further embodiment the finished composition of the invention may be prepared by solution polymerization of the corresponding monomers in the non-volatile base or swelling fluid and subsequent milling of the resulting mixture. In case of emulsion polymerization or pearl polymerization particles of the desired size may be directly obtained.

In case the polymerization is carried out in an aqueous medium, the resulting dispersion may be added to the non-volatile swelling agent, and water is evaporated. Further solution polymerizates prepared in a solvent other than the swelling agent may be used for the present purposes. Preferred additives consist of spherical polymer particles which are obtained, e.g., by emulsion polymerization, pearl polymerization or precipitation polymerization. Due to their spherical shape these particles are of improved stability against mechanical deterioration; besides they improve the lubricating properties of the whole composition. In general, solution polymerizations require greater amounts of cross-linking agents than bulk and pearl polymerizations in order to obtain products of equal swelling properties.

The average particle size of the macromolecular substances in the compositions of the present invention should be less than about 0.1 mm., and preferably between 0.01 and 10µ. However, certain amounts of greater particles may be present; these particles will be disintegrated during use of the composition.

Suitable swelling agents are those non-volatile materials which per se exhibit those properties which are desirable in lubricants, hydraulic oils and lubricating greases, as well as provide good resistance to aging. Such swelling agents are the oleaginous component of the composition. Aliphatic, cycloaliphatic and aromatic oils and fats, esters of fatty acids and polycarboxylic acids, polyethers as well as silicone oils are preferred swelling agents. The properties of these substances may be improved by the addition of antioxidants, dispersants, detergents, soaps, anticorrosive agents, oil-soluble linear polymers, graphite, molybdenum sulfide and the like.

In preparing the compositions of the present invention the choice of the slightly cross-linked macromolecular substance depends on the swelling agent which is to be used. Appropriate combinations of the two components are those wherein the polymers become highly swollen. Satisfactory combinations can be easily ascertained by some preliminary tests or by the known solubility properties of the basic polymer not subjected to cross-linking.

Especially advantageous properties are exhibited by combinations wherein the swelling agent is only a poor solvent for the macromolecular substance. In such instances the maximum degree of swelling may increase markedly with rising temperature, whereby the usual viscosity-temperature curve is inverted.

Optimum viscostatic effects are obtained by use of approximately that amount of swelling agent which is necessary for maximum swelling. Smaller amounts of swelling agent than the above given are also operable. By addition of more swelling agent than the amount necessary for maximum swelling the viscostatic effect decreases.

The following specific examples will serve to further illustrate the present invention.

*Preparation 1.—Preparation of cross-linked polystyrene by pearl polymerization*

2 grams of a wetting agent (secondary alkyl sulfate) and 25 grams of a high-molecular weight copolymer of sodium methacrylate and methyl methacrylate are dissolved in 2875 ml. of distilled water. In this solution a mixture of 750 grams of styrene, 3.75 grams of butanediol dimethacrylate and 7.5 grams of benzoyl peroxide is dispersed by means of a high-speed stirrer. Under continuous stirring the mixture immediately is heated to 45° C. During 1 hour the temperature is raised to 90° C. The mixture is maintained at this temperature for about 7 hours, cooled and acidified with hydrochloric acid. The finely divided polymerizate is sucked off and dried. The product amounts to 685 grams. Prior to its use it is disintegrated in a ball mill.

*Preparation 2.—Preparation of cross-linked polystyrene by emulsion polymerization*

In a container equipped with a stirrer 100 grams of stearic acid are dissolved in a mixture consisting of 3000 grams of distilled water and 24 grams of 25% ammonia with heating. Then 8 grams of potassium persulfate, 12 grams of sodium bicarbonate and a mixture of 1996 grams of styrene and 4 grams of glycol dimethacrylate are added. The resulting mixture is polymerized at 60° C. under nitrogen for 8 hours. After that period of time a finely divided dispersion of 40% solids content is obtained. The polymer is recovered by drying the dispersion and disintegration of the residue.

*Preparation 3.—Preparation of cross-linked poly-nonyl methacrylate by emulsion polymerization*

In a container equipped with a stirrer a mixture of 150 ml. of water, 5 grams of sodium stearate, 0.2 gram of potassium persulfate, 0.3 gram of sodium bicarbonate, 99.8 grams of nonyl methacrylate and 0.2 gram of glycol dimethacrylate under nitrogen is heated 18 hours to 50° C., 1 hour to 60° C., 5 hours to 70° C. and 3 hours to 95° C. with stirring. There is obtained a dispersion of very fine particles; the solids content of the dispersion amounts to 41 percent by weight.

EXAMPLE 1

The pearl polymerizate described in Preparation 1 was dissolved in Shell Dutrex 3 in concentrations of 5, 9 and 15% by weight respectively (Dutrex 3 is an aromatic extract of mineral oil; flash point=157° C.; pour point=−35° C.; aniline point=−9.2° C.). In order to achieve complete swelling the mixtures were heated with stirring to 120° C. The viscosities of the mixtures were determined at 20° C., 50° C., 100° C. and 150° C. by use of a Brookfield viscosimeter type HBT at various revolutions per minute. The obtained results may be seen from FIGURES 2 to 4. FIG. 1 shows the viscosity of the pure base oil.

EXAMPLE 2

The pearl polymerizate described in Preparation 1 was dissolved in mixtures of Dutrex 3 and Shell Carnea Oil 31 (Shell Carnea Oil 31 has a specific gravity of 0.937; flash point=187° C.; pour point=−30° C.; viscosity at 50° C.=4.5° Engler) in the same way as described in Example 1 in amounts as stated in the following table:

| Dutrex 3 | Carnea Oil 31 | Polystyrene | Fig. |
|---|---|---|---|
| 90 | 10 | ---------- | 5 |
| 85 | 10 | 5 | 6 |
| 81 | 10 | 9 | 7 |
| 76 | 10 | 14 | 8 |

The corresponding viscosities are stated in FIGURES 5 to 8.

EXAMPLE 3

To 90 parts by weight of Shell Dutrex 3, 25 parts by weight of the polystyrene dispersion described in Preparation 2 were added with stirring at 130° C. The water contained in the dispersion immediately evaporated with foaming. The swollen polymer was finely dispersed in the oil. After removal of the water for a short period of time the mixture was heated to about 180° C.

The polymer content of the homogeneous mixture amounted to 10%. From a sample the polymer was precipitated by diluting with petroleum ether. The precipitate was dried and showed a maximum swelling in benzene at 20° C. of 20 to 21 grams of benzene per gram of polymer. In benzene 10% of the polymer dissolved. The viscosities of mixtures of Dutrex 3 and the above polymer were determined at 20° C., 40° C., 60° C., 80° C. and 100° C. by means of a Brookfield viscosimeter HBT, spindle 4. The results are listed in FIG. 9.

EXAMPLE 4

To 200 parts by weight of Shell Vitrea Oil 27 (paraffinic lubricating oil, solvent-refined; specific gravity= 0.870; flash point=221° C.; pour point=−12° C.; viscosity at 50° C.= 4.5° Engler) 82 parts by weight of the emulsion polymerizate described in Preparation 3 are added with stirring. A homogeneous mixture containing 14% of polymer is obtained. By addition of Vitrea Oil 27 the polymer concentration is decreased to from 2 to 12%. Viscosity determinations made by use of a Brookfield viscosimeter HBT at 20° C. and 100° C. showed the following results:

| Polymer content, percent | Testing Element | Revolutions per min. | Viscosity (poises) 20° | Viscosity (poises) 100° |
|---|---|---|---|---|
| 14 | T-A | 1 | 450 | 450 |
|  |  | 2.5 | 320 | 320 |
|  |  | 5 | 230 | 180 |
| 14 | Spindle 2 | 5 | 280 | 310 |
|  |  | 10 | 180 | 170 |
|  |  | 20 | 130 | 100 |
| 12 | T-A | 1 | 130 | 160 |
|  |  | 2.5 | 96 | 96 |
|  |  | 5 | 80 | 64 |
| 12 | Spindle 2 | 5 | 90 | 110 |
|  |  | 10 | 64 | 68 |
|  |  | 20 | 48 | 43 |
| 10 | T-A | 1 | 32 | 24 |
|  |  | 2.5 | 25 | 20 |
|  |  | 5 | 22 | 16 |
| 10 | Spindle 2 | 5 | 29 | 29 |
|  |  | 10 | 23 | 20 |
|  |  | 20 | 19 | 13 |
| 8 | Spindle 2 | 5 | 10 | 4 |
|  |  | 10 | 8.6 | 3.5 |
|  |  | 20 | 7.8 | 2.6 |
| 6 | Spindle 2 | 5 | 3.6 |  |
|  |  | 10 | 3.5 | 0.6 |
|  |  | 20 | 3.2 | 0.6 |
|  |  | 50 | 3.2 | 0.7 |
| 4 | Spindle 2 | 5 | 1.2 |  |
|  |  | 10 | 1.9 |  |
|  |  | 20 | 1.8 |  |
|  |  | 50 | 1.8 |  |
|  |  | 100 | 1.8 |  |
| 4 | Spindle 1 | 5 | 2.4 | 0.32 |
|  |  | 10 | 2.4 | 0.24 |
|  |  | 20 | 2.3 | 0.28 |
|  |  | 50 | 2.2 | 0.33 |
|  |  | 100 | 2.3 | 0.42 |
| 2 | Spindle 2 | 10 | 0.6 |  |
|  |  | 20 | 0.8 |  |
|  |  | 50 | 1.0 | 0.32 |
|  |  | 100 | 1.05 | 0.45 |
| 2 | Spindle 1 | 5 | 0.96 |  |
|  |  | 10 | 1.12 |  |
|  |  | 20 | 1.12 | 0.08 |
|  |  | 50 | 1.20 | 0.19 |
|  |  | 100 | 1.20 | 0.28 |

There are obviously a number of modifications which come within the spirit of this invention; further it is not intended that the invention as defined in the appended claims be limited to specific examples that have been given for the purpose of illustration only.

I claim:
1. A composition of matter consisting essentially of a lubricant base composition and a tridimensionally swellable macromolecular substance cross-linked to such extent that the maximum degree of swelling of said macromolecular substance in the base composition at room temperature is at least about 1, said macromolecular substance being selected from the group consisting of polystyrene and poly-nonyl-methacrylate and being present in the form of particles having an average particle size of less than about 0.1 mm., the macromolecular substance being present in the base composition in an amount between 2 and 50% by weight.
2. A composition as claimed in claim 1 wherein said lubricant base composition is selected from the group consisting of aliphatic, cycloaliphatic and aromatic oils and fats, esters of fatty acids and poly carboxylic acids, polyethers and silicone oils.

References Cited by the Examiner
UNITED STATES PATENTS
2,356,127   8/1944   Thomas et al. _____ 252—59
2,471,234   5/1949   Morris et al. _____ 252—59
2,996,455   8/1961   Brown et al. _____ 252—56 X
3,032,538   5/1962   Spaulding et al. _____ 252—56 X FOREIGN PATENTS
836,720   6/1960   Great Britain.

References Cited by the Applicant
C. J. Boner: "Manufacture and Application of Lubricating Greases" (New York 1954), e.g., p. 757.

DANIEL E. WYMAN, *Primary Examiner.*
JULIUS GREENWALD, *Examiner.*
P. C. BAKER, P. P. GARVIN, *Assistant Examiners.*